(12) United States Patent
Matsushita et al.

(10) Patent No.: US 6,775,017 B1
(45) Date of Patent: Aug. 10, 2004

(54) IMAGE DUPLICATING APPARATUS AND STORAGE MEDIUM

(75) Inventors: Satoshi Matsushita, Nagoya (JP); Hiroshi Morisaki, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/439,282

(22) Filed: Nov. 15, 1999

(30) Foreign Application Priority Data

Nov. 16, 1998 (JP) .......................................... 10-324766
Nov. 16, 1998 (JP) .......................................... 10-324767
Nov. 2, 1999 (JP) .......................................... 11-312501

(51) Int. Cl.$^7$ .......................................... G06K 15/00
(52) U.S. Cl. ...................................... 358/1.13; 358/1.9
(58) Field of Search .......................... 358/1.1, 1.9, 2.1, 358/3.01, 1.13, 1.16, 1.18, 531, 538, 540, 1.6, 448, 450, 471, 404, 444; 382/162, 167, 166

(56) References Cited

U.S. PATENT DOCUMENTS 4,908,712 A * 3/1990 Uchiyama et al. ........... 358/1.9
5,099,335 A * 3/1992 Kato .......................... 358/296

FOREIGN PATENT DOCUMENTS

| JP | A-63-318574 | 12/1988 |
|---|---|---|
| JP | A-1-201681 | 8/1989 |
| JP | A-4-57069 | 2/1992 |
| JP | A-6-233126 | 8/1994 |
| JP | A-8-192541 | 7/1996 |
| JP | A-8-275013 | 10/1996 |
| JP | A-9-322005 | 12/1997 |
| JP | A-9-322006 | 12/1997 |
| JP | A-9-326942 | 12/1997 |
| JP | A-10-112802 | 4/1998 |

* cited by examiner

Primary Examiner—Arthur G. Evans
(74) Attorney, Agent, or Firm—Oliff & Berridge, PLC

(57) ABSTRACT

The invention provides a image duplicating apparatus capable of forming images for duplication using standard four ink colors in a standard color style, or using more ink colors than the standard ink colors when duplicating images read from an original on a recording paper. A CPU determines which of the single-copying mode, where images read from the original are duplicated on a sheet of the recording paper, or the multi-copying mode, where images read from the original are duplicated on the sheets of the recording paper, is set. When it is determined that the multi-copying mode is set, the CPU starts duplicating in the standard color style. When it is determined that the single-copying mode is set, the CPU starts duplicating in the fine color style.

35 Claims, 8 Drawing Sheets

IMAGE DUPLICATING APPARATUS AND STORAGE MEDIUM

BACKGROUND OF THE INVENTION

1. Field of Invention

The invention relates to an image duplicating apparatus, such as a copying machine and a facsimile machine, that duplicates an image of an original on a recording paper and to a storage medium that stores a program for controlling the image duplicating apparatus.

2. Description of Related Art

Currently, there are some facsimile machines having printing functions and scanner functions, and the like, in addition to ordinary facsimile functions. Those facsimile machines may be used as periphery input/output devices of personal computers. With the functions of those facsimile machines further developed, some facsimile machines have duplicating functions for duplicating images read from an original on a recording paper. The facsimile machines with the duplicating functions have two copying modes, similar to an ordinary copying machine. One is a single-copying mode where images read from an original are duplicated on a sheet of the recording paper. The other is a multi-copying mode where images read from an original are duplicated on the sheets of the recording paper. In such facsimile machines, either mode can be set.

In the multi-copying mode, there are provided two copying methods. One is known as a stack copying method and the other is a sort copying method. For example, when three (3) copies of one page each of the original A, B, and C (total of 3 pages) are designated and copied using the stack copying method, images are first read from the original A and those read images are consecutively duplicated on three sheets of the recording paper. Then, images are read from the original B and those read images are consecutively duplicated on three sheets of the recording paper. Images on the original C are duplicated in the same manner as described above. In other words, in the stack copying method, images on an original are read and duplicated on the required number of recording paper to produce the designated number of copies. In the stack copying method, a memory capable of storing images on at least one page, is required. When three (3) copies of one page each of the original A, B, and C (total of 3 pages) are designated and copied using the sort copying method, for example, images are first read from the original A and duplicated on one sheet of the recording paper. While the image data of the original A is stored in a memory, images are read from the next original B and duplicated on another sheet of the recording paper. Similarly, while the image data of the original B is stored in a memory, images are read from the next original C and duplicated on another sheet of the recording paper. Thus, one copy of the originals A, B, and C is produced. Thereafter, the other two (2) copies are produced in the same manner as described above, based on the stored image data of the originals A, B, and C. In this sort copying method, a memory capable of storing images on all the pages of the originals, is required.

In an ink jet type color printer, four ink colors of cyan, magenta, yellow, and black (CMYK) are used as standard ink colors when color images are formed using the printer. Some ink jet type color printers currently add two further particular ink colors of light cyan (LC) and light magenta (LM) to the standard ink colors, to produce more subtle tones and finer color graduations. Six-color ink jet type printers are adopted for facsimile machines having such as the above-described duplication functions, to make the facsimile machines more multifunctional. The image forming processing is performed for duplication while storing the duplication data according to the number of ink colors to be used for duplication, in a memory.

However, in a conventional facsimile machine having the functions of duplication using a color printer mechanism that employs the above-described six ink colors including two further particular ink colors, when duplicating is performed using more ink colors of six ink colors than the standard four ink colors, the size of the duplication data to be stored in a memory becomes larger than that of duplication data when the standard four ink colors are used for image forming processing. According to conditions during duplication, such as copying mode and color style settings, the duplication data may occupy all the data storage area in the memory. This may be a serious problem especially in the multi-copying mode where the duplication data at least for one page of the original needs to be stored in the memory. If duplication data occupies all the data storage area in the memory, units such as the CPU that controls the operations of a facsimile machine, cannot stably perform the required duplicating operations, causing problems for the other operations of the machine. To solve the above-described problem, the increase in the size of the memory will be the easiest way, however, it leads to the increase in costs. Therefore, improvements in terms of costs are also required.

SUMMARY OF THE INVENTION

One aspect of the invention is to provide an image duplicating apparatus capable of stably performing duplicating processing to be required via a memory, without increasing the size of the memory. Another aspect of the invention is to provide a storage medium that stores programs for controlling the image duplicating apparatus.

According to one aspect of the invention, there is provided an image duplicating apparatus capable of forming images in a standard color style using standard ink colors or in a fine color style using more ink colors than the standard ink colors when images read from an original are duplicated on a recording paper. The image duplicating apparatus includes a setting copying mode determination device that determines whether the single-copying mode where images read from the original are duplicated on a sheet of the recording paper, or the multi-copying mode, where images read from the original are duplicated on the sheets of the recording paper, is set, and a duplicating operation controlling device that starts duplicating in the fine color style when the setting copying mode determination device determines that the single-copying mode is set, and that starts duplicating in the standard color style when the setting copying mode determination device determines that the multi-copying mode is set.

In the image duplicating apparatus, duplicating in the single-copying mode where images read from the original may be duplicated on a sheet of the recording paper, is started in the fine color style wherein the amount of duplication data to be processed becomes greater than when it is processed using the standard ink colors, and duplicating in the multi-copying mode where images read from the original are duplicated on the sheets of the recording paper, is started in the standard color style wherein the duplication data is processed using the standard ink colors. Therefore, the duplication data processed in each copying mode is optimized so that all the duplication data can be stored in the memory. Especially, the number of ink colors to be used is limited to the standard ink colors in the multi-copying mode, so that the size of the duplication data can be minimized. Consequently, the space in the memory occupied by the duplication data is reduced as much as possible. The duplicating operations in each copying mode can be stably performed, without increasing the memory size and its costs.

The image duplicating apparatus may further include a color style setting device that presets which of the standard or fine color styles is to be used for duplication, wherein when the setting copying mode determination device determines that the multi-copying mode is set, the duplicating operation controlling device starts duplicating in the standard color style regardless of the color style set by the color style setting device, and when the setting copying mode determination device determines that the single-copying mode is set, the duplicating operation controlling device starts duplicating in the color style set by the color style setting device.

Since the color style that the user sets is used for duplicating in the single-copying mode, the duplication quality that meets the user's needs will be produced. Even when the fine color style is set for the multi-copying mode, the color style is forcibly changed to the standard color style, so that the size of the duplication data can be minimized. Therefore, all the spaces in the memory will not be occupied by the duplication data, and the duplicating processing can be stably performed in the multi-copying mode.

In an image duplicating apparatus capable of forming images in a standard color style using standard ink colors or in a fine color style using more ink colors than the standard ink colors when images read from an original are duplicated on a recording paper, included are a setting copying mode determination device that determines which of the single-copying mode or the multi-copying mode is set, and a duplicating operation controlling device that reduces the resolution of a duplication data from the normal setting resolution and starts duplicating in the fine color style based on the duplication data obtained at a lower resolution when the setting copying mode determination device determines that the multi-copying mode is set.

Even when duplicating in the multi-copying mode is performed in the fine color style, the resolution of the duplication data is reduced from that of duplication data obtained by the images read at the normal setting resolution. Therefore, the size of the duplication data can be minimized by reducing resolution of the duplication data, and the situation that all the spaces in the memory are occupied by the duplication data, can be prevented. Consequently, the duplicating operations wherein the great amount of the duplication data is required to be processed via the memory, can be stably performed, without increasing the memory size and its costs.

The image duplicating apparatus may further include a color style setting device that presets which of the standard or fine color styles is used for duplication, wherein when the setting copying mode determination device determines that the multi-copying mode is set and the color style setting device sets the fine color style, the duplicating operation controlling device reduces the resolution of the duplication data from that set for duplicating in the standard color style, and starts duplicating in the fine color style based on the duplication data obtained at a lower resolution.

Since duplicating is performed based on the color style that the user sets, the duplication quality that meets the user's needs will be produced. Even when the user sets the fine color style in the multi-copying mode, the resolution of the duplication data is automatically reduced, so that the size of the duplication data will be minimized. Therefore, all the spaces in the memory will not be occupied by the duplication data, and the duplicating processing can be stably performed in the multi-copying mode based on the color style set by the user.

In the image duplicating apparatus, when the setting copying mode determination device determines that the multi-copying mode is set, duplicating either in the standard color style, or in the fine color style by reducing the resolution of a duplication data from the normal setting resolution and based on the duplication data obtained at a lower resolution, can be selected.

Since duplicating in the multi-copying mode may be performed by selecting either the standard color style wherein the number of colors to be used is limited though the image quality is preferred, or the fine color style for which images are read at a resolution lower than the normal setting though the color tone is preferred, a user can obtain the designated number of copies in the multi-copying mode by selecting which of the image quality or the color tone is preferred.

An image duplicating apparatus capable of forming images in a standard color style using standard ink colors or in a fine color style using more ink colors than the standard ink colors when images read from an original are duplicated on a recording paper, may include an available memory calculation device that calculates the amount of free space available in a memory, an available memory comparison device that compares the amount of free space available in the memory obtained by the available memory calculation device, with the predetermined value, and a duplicating operation controlling device that avoids duplicating in the fine color style and starts duplicating in the standard color style when the available memory comparison device produces the result that the amount of free space available in the memory is below the predetermined value.

Since duplicating is performed not in the fine color style but in the standard color style when the free space available in the memory do not exceed the predetermined value, the situation that the memory cannot store all the duplication data due to the small amount of free space available in the memory, can be prevented. Consequently, the duplicating operations required via the memory can be stably performed, without increasing the memory size and its costs.

For such image duplicating, a color style setting device that presets which of the standard or fine color styles is used for duplication, is provided. When the available memory comparison device produces the result that the amount of free space available in the memory is below the predetermined value, the duplicating operation controlling device starts duplicating in the color style set by the color style setting device if the setting copying mode determination device determines that the single-copying mode is set.

Even when the free space available in the memory is below the predetermined value, duplicating in the single-copying mode is performed in the color style set by the color style setting device. Therefore, the duplication quality that meets the user's needs will be produced. When the free space available in the memory do not exceed the predetermined value, duplicating in the multi-copying mode is performed by forcibly selecting the standard color even when the fine color style is set. Therefore, all the spaces in the memory will not be occupied by the duplication data, and the duplicating processing can be stably performed in the multi-copying mode.

According to the another aspect of the invention, there is provided an storage medium that stores programs for controlling an image duplicating apparatus capable of forming images in a standard color style using standard ink colors or in a fine color style using more ink colors than the standard ink colors when images read from an original are duplicated on a recording paper. The storage medium include a setting copying mode determination program for determining which of the single-copying mode where images read from the original are duplicated on a sheet of the recording paper, or the multi-copying mode where images read from the original are duplicated on the sheets of the recording paper, is set, and a duplicating operation controlling program for starting duplicating in the fine color style when it is determined based on the setting copying mode determination program that the single-copying mode is set, and for starting duplicating in the standard color style when it is determined based on the setting copying mode determination program that the multi-copying mode is set.

By activating the CPU based on the stored program, achieved is the operations of an image duplicating apparatus, such as starting duplicating in the fine color style when it is determined that the single-copying mode is set, and starting duplicating in the standard color style when it is determined that the multi-copying mode is set.

An storage medium may include a setting copying mode determination program for determining which of the single-copying mode where images read from the original are duplicated on a sheet of the recording paper, or the multi-copying mode where images read from the original are duplicated on the sheets of the recording paper, is set, and a duplicating operation controlling program for reducing the resolution of a duplication data from the normal setting resolution when it is determined based on the setting copying mode determination program that the multi-copying mode is set and starting duplicating in the fine color style.

Also, by activating the CPU based on the stored program, achieved is the operations of an image duplicating apparatus, such as reducing the resolution of a duplication data from the normal setting resolution when it is determined that the multi-copying mode is set and starting duplicating in the fine color style.

An storage medium also may include an available memory calculation program for calculating the amount of free space available in a memory, an available memory comparison program for comparing the amount of free space available in the memory obtained by the calculation based on the available memory calculation program, with the predetermined value, and a duplicating operation controlling program for avoiding duplicating in the fine color style and starting duplicating in the standard color style when the result that the amount of free space available in the memory is below the predetermined value, is obtained based on the available memory comparison program.

Further, by activating the CPU based on the stored program, achieved is the operations of an image duplicating apparatus, such as avoiding duplicating in the fine color style and starting duplicating in the standard color style when the amount of free space available in the memory is below the predetermined value.

According to another aspect of the invention, there is provided an image forming apparatus capable of forming images onto a recording paper using standard ink colors or using more ink colors than the standard ink colors and capable of processing image data for the image forming processing. The image forming apparatus may include a using an ink color detecting device that detects which of the standard ink colors or more ink colors than the standard ink colors, are to be used, and an image data preparing device that prepares an image data based on the standard color designation conditions suitable for the standard ink colors when the ink color use detecting device detects that the standard ink colors are to be used, and that prepares the image data based on the fine color designation conditions suitable for more ink colors than the standard ink colors when the ink color use detecting device detects that more ink colors than the standard ink colors are to be used.

In the image forming apparatus of the invention, when images are formed using the standard ink colors, image data is prepared based on the standard color designation conditions. On the other hand, when the images are formed using more ink colors than the standard ink colors, the image data is prepared based on the fine color designation conditions. Since the designation conditions are changed according to the number of ink colors to be used and the image forming processing is performed using the image data optimized according to the respective designation conditions suitable for the respective ink colors, the high image quality output is produced according to the number of ink colors to be used, without requiring any complicated processing.

When the image data preparing device prepares the image data based on the standard color designation conditions or the fine color designation conditions, the color tone correction processing designated according to the respective color designation conditions, is performed for the image data.

The color tone correction processing, for example, with respect to the gamma correction, contrast, and brightness, is performed for the image data according to the number of ink colors to be used, when the image data is prepared based on the respective color designation conditions. Therefore, the image forming processing is performed using the image data optimized according to the number of ink colors to be used with respect to the color tones, resulting in the superior quality output mainly as to color tones.

When the image data preparing device prepares the image data based on the standard color designation conditions or the fine color designation conditions, the image data is generated, corresponding to the image quality levels designated according to the respective color designation conditions.

Since the image data is generated, corresponding to the image quality levels designated according to the number of ink colors to be used when the image data is prepared based on the respective color designation conditions, the image forming processing is performed using the image data optimized according to the number of ink colors to be used with respect to the image quality levels, such as the input resolution and the output resolution, resulting in the superior quality output mainly as to image quality.

The image forming apparatus may further include an image input device that reads images from an original to obtain the image data. The image data preparing device reads the image data from the image input device and applies the respective color designation conditions to generate the image data according to the number of ink colors to be used.

Since the images can be formed onto a recording paper based on the image data obtained by reading the images from the original, this may be applied when a facsimile machine having copying functions, for example, is used stand-alone.

The image forming apparatus may further include an interface capable of receiving the image data from an external apparatus. The image data preparing device receives the image data from the external apparatus via the interface and applies the respective color designation conditions to generate the image data according to the number of ink colors to be used.

Since the images can be formed onto a recording paper based on the image data received from an external apparatus, this may be applied to a printer being used as the periphery equipment of a general personal computer, and a video printer that is connected to a television or a video camera.

According to another aspect of the invention, there is provided an storage medium that stores programs for controlling an image forming apparatus capable of forming images onto a recording paper using standard ink colors or using more ink colors than the standard ink colors and capable of processing image data for the image forming processing. The storage medium may include a ink color use detecting program for detecting which of the standard ink colors or more ink colors than the standard ink colors, are to be used, and an image data preparing program for preparing an image data based on the standard color designation conditions suitable for the standard ink colors when it is detected based on the ink color use detecting program that the standard ink colors are to be used, and for preparing the image data based on the fine color designation conditions suitable for more ink colors than the standard ink colors when it is detected based on the ink color use detecting program, that more ink colors than the standard ink colors are to be used.

In above-described storage medium, by activating the CPU based on the stored program, achieved is the operations of the image forming apparatus, such as a detecting device that detects which of the standard ink colors or more ink colors than the standard ink colors, are to be used, and preparing image data based on the standard color designation conditions suitable for the standard ink colors when the ink color use detecting device detects that the standard ink colors are to be used, and preparing the image data based on the fine color designation conditions suitable for more ink colors than the standard ink colors when the ink color use detecting device detects that more ink colors than the standard ink colors are to be used.

Further objects, details, and advantages of the invention will be apparent from the following detailed description, when read in conjunction with the drawings.

BRIEF DESCRIPTION OF THE DRAWINGS

Preferred embodiments of the invention will be described in detail with reference to the following figures wherein.

DETAILED DESCRIPTION OF PREFERRED EMBODIMENTS

Preferred embodiments of the invention will be described in detail with reference to the figures.

Figure 1:
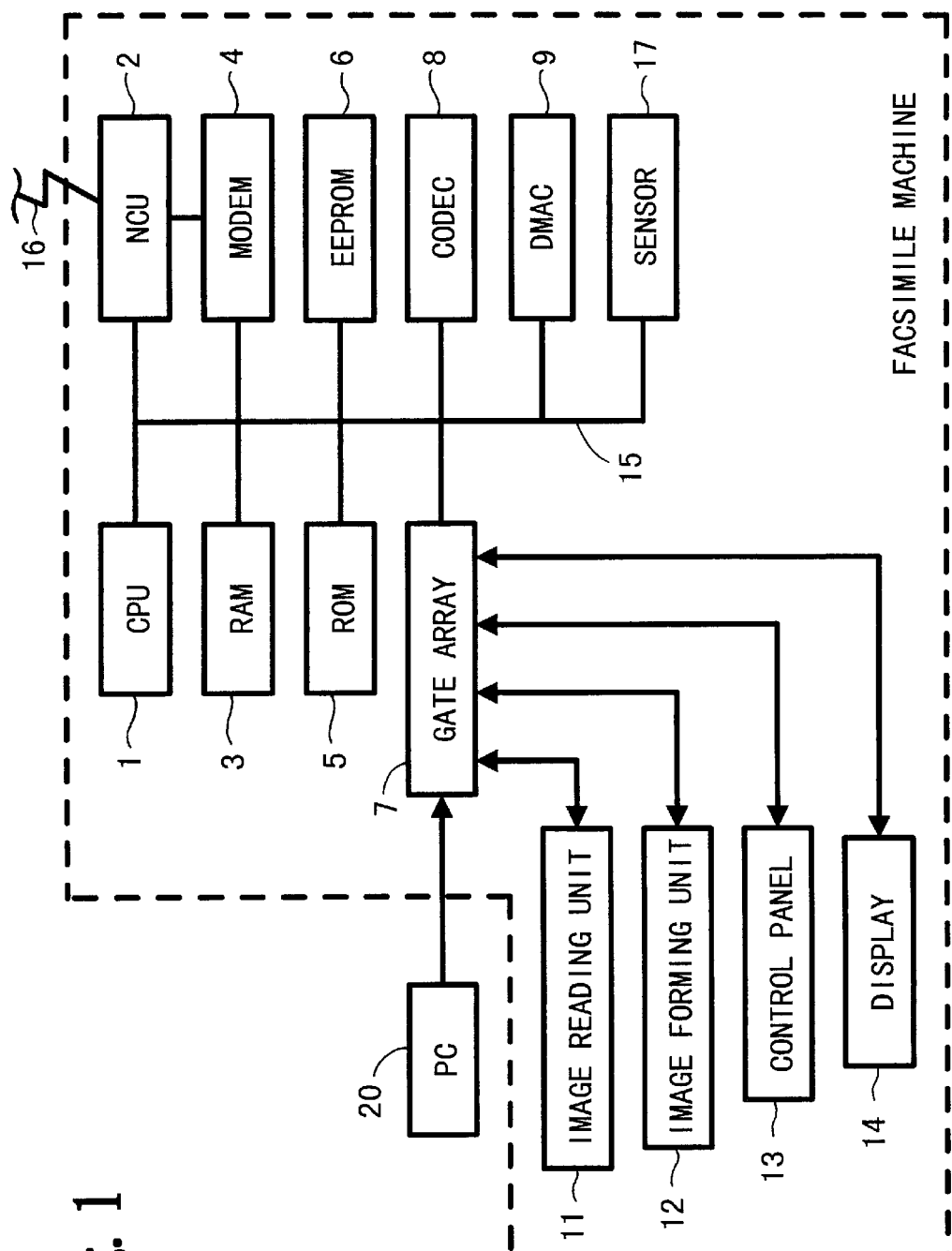
FIG. 1 is a block diagram of an image duplicating apparatus according to an embodiment of the invention.

FIG. 1 is a block diagram of an image duplicating apparatus according to an embodiment of the invention. In this embodiment, an image duplicating apparatus is a facsimile machine. The facsimile machine can used with a personal computer 20 connected. As shown in FIG. 1, the facsimile machine includes a central processing unit (CPU) 1, a network control unit (NCU) 2, a random-access memory (RAM) 3, a modem 4, a read-only memory (ROM) 5, an electrically erasable programmable read-only memory (EEPROM) 6, a gate array 7, a CODEC 8, a direct memory access controller (DMAC) 9, an image reading unit 11, an image forming unit 12, a control panel 13, and a display 14. The CPU 1, the NCU 2, the RAM 3, the modem 4, the ROM 5, the EEPROM 6, the gate array 7, the CODEC 8, and the DMAC 9 are connected with each other by a bus line 15. The bus line 15 includes an address bus, a data bus, and a control signal line. The image reading unit 11, the image forming unit 12, the control panel 13, and the display 14 are connected to the gate array 7. An external apparatus of the PC 20 is also connected to the gate array 7 via an input/output port (not shown). A public telephone line 16 is connected to the NCU 2.

The CPU 1 controls the operations of the facsimile machine. The NCU 2 connected to the public telephone line 16, performs the network controls. The battery of the RAM 3 is backed by, for example, as a charging battery, and the RAM 3 provides spaces for the operations by the CPU 1 and for storing various kinds of data. The modem 4 modulates and demodulates facsimile data. The ROM 5 stores various kinds of programs and data, such as setting values. The EEPROM 6 stores various kinds of flags and setting data. The gate array 7 functions as an input/output interface of the CPU 1. The CODEC 8 encodes and decodes the facsimile data. The DMAC 9 writes data into and reads data from the RAM 3.

The image reading unit 11 has a light source and an image sensor. The image reading unit 11 reads images from an original and outputs image signals. The image forming unit 12 has a printer mechanism of an ink jet type, and the like, and forms images on a recording paper. In the printer mechanism of the image forming unit 12, color images can be formed in two styles. One uses the standard four ink colors of CMYK (hereinafter referred to as the "standard color style"), and the other uses two further particular ink colors of light cyan (LC) and light magenta (LM) in addition to the standard four CMYK ink colors (hereinafter referred to as the "fine color style"). In the printer mechanism of the image forming unit 12, the standard four CMYK color ink cartridge or the six color ink cartridge including LC and LM in addition to the standard four CMYK ink colors, may be mounted on the carriage. According to the number of color inks set in the carriage, color images are formed using four ink colors or six ink colors. The number of color inks set in the carriage is detected by a sensor 17. The sensor 17 electrically detects the electrodes which have different patterns according to the number of color inks, such as those provided in the ink cartridges.

The control panels 13 has various keys and outputs input signals of, for example, copy modes setting(described below) according to the inputs by the key operations by a user. The display 14 has a liquid crystal display (LCD) for displaying various information, such as characters and figures.

The main points of the invention is briefly explained below. The facsimile machine of this embodiment has ordinary facsimile communication functions as well as functions of message-recording with digital sounds, and memory timer transmission functions for transmitting facsimile image data to the desirable receiver at the setting time. Besides above-described functions, the facsimile machine of this embodiment has printer functions for forming images based on the print cue from the PC 20, and scanner functions for reading images based on the reading cue from the PC 20. Further, the functions that the facsimile machine has and that may be used when facsimile machine is used stand-alone, is duplicating functions for duplicating images read from an original on a recording paper. That is, the duplicating functions are similar to the copying functions, such as ordinary copying machines have. Especially, in the duplication functions, either a single-copying mode where images read from an original are duplicated on a sheet of the recording paper, or a multi-copying mode where images read from an original are duplicated on the sheets of the recording paper, can be set. In the multi-copying mode, Y copies of X pages of the original are produced using the stack or sort copying methods. As described above, color images can be formed in either standard color style or the fine color style using standard ink colors (four colors of CMYK, for example), or using more ink colors (six colors of the four CMYK colors and two further particular colors, for example). A user can preset which color style is to be used for duplication. The setting of the color style is stored in the EEPROM 6.

When duplicating is performed according to the above-described copying modes and color styles, the CPU 1 performs the image forming processing for duplication while storing the duplication data in the RAM 3 which serves as a printer buffer memory. When the copying mode is set in the single-copying mode, the CPU 1 stores the duplication data for one page of an original in the RAM 3 and starts duplicating in the fine color style. When the copying mode is set in the multi-copying mode, the CPU 1 stores the duplication data at least for one page of an original in the RAM 3 and starts duplicating in the standard color style. When the multi-copying mode is set, the CPU 1 may reduce the resolution of the duplication data from the normal setting resolution, to start duplicating in the fine color style based on that duplication data. Further, the CPU 1 calculates the amount of free space available in the RAM 3 where any data has not been stored. Then, the amount of free space available in the RAM 3 obtained by the calculation by the CPU 1, is compared with the predetermined value. If the amount of free space available in the RAM 3 is below the predetermined value, duplicating in the fine color style is avoided and duplicating in the standard color style is performed. The duplicating operations are controlled as described above by the CPU 1, so that enough free space to process the duplication data is secured.

The CPU 1 realizes a setting copying mode determination device that determines which of the single-copying mode where images read from an original are duplicated on a sheet of the recording paper, or the multi-copying mode where images read from an original are duplicated on the sheets of the recording paper, is set, and a duplicating operation controlling device that starts duplicating in the fine color style when the setting copying mode determination device determines that the single-copying mode is set and that starts duplicating in the standard color style when the setting copying mode determination device determines that the multi-copying mode is set.

The CPU 1 also realizes the duplicating operation controlling device that reduces the resolution of the duplication data from the normal setting resolution and starts duplicating in the fine color style when the setting copying mode determination device determines that the multi-copying mode is set.

Further, the CPU 1 realizes an available memory calculation device that calculates the amount of free space available in a memory, and an available memory comparison device that compares the amount of free space available in the memory obtained by the calculation by the available memory calculation device, with the predetermined value, and the duplicating operation controlling device that avoids duplicating in the fine color style and starts duplicating in the standard color style when the available memory comparison device produces the result that the amount of free space available in the memory is below the predetermined value.

The control panel 13, and the EEPROM 6 that stores the settings made using the control panel 13, realize a color style setting device that presets which of the standard or fine color styles are used for duplication.

The ROM 5 performs the image forming processing while storing the duplication data in the memory when images read from an original are duplicated on a recording paper. The ROM 5 is a storage medium that stores programs for controlling the image duplicating apparatus capable of performing image forming processing in the standard color style where the standard ink colors are used or in the fine color style where more ink colors than the standard ink colors, are used. The ROM 5 realizes the storage medium that stores programs including a setting copying mode determination program for determining which of the single-copying mode where images read from an original are duplicated on a sheet of the recording paper, or the multi-copying mode where images read from an original are duplicated on the sheets of the recording paper, is set, and a duplicating operation controlling program for starting duplicating in the fine color style when it is determined based on the setting copying mode determination program that the single-copying mode is set, and for starting duplicating in the standard color style when it is determined based on the setting copying mode determination program that the multi-copying mode is set.

The ROM 5 also realizes the storage medium that stores programs including the duplicating operation controlling program for reducing the resolution of the duplication data from the normal setting resolution and starting duplicating in the fine color style when it is determined based on the setting copying mode determination program that the multi-copying mode is set.

Further, the ROM 5 realizes the storage medium that stores programs including an available memory calculation program for calculating the amount of free space available in a memory, and an available memory comparison program for comparing the amount of free space available in the memory obtained by the calculation based on the available memory calculation program, with the predetermined value, and the duplicating operation controlling program for avoiding duplicating in the fine color style and starting duplicating in the standard color style when the result that the amount of free space available in the memory is below the predetermined value, is obtained based on the available memory comparison program.

The operations of a facsimile machine of the embodiments having the above-described constructions will be described below with reference to the figures.

FIGS. 2–6 are flowcharts illustrating duplicating operations by the facsimile machine.

Figure 2:
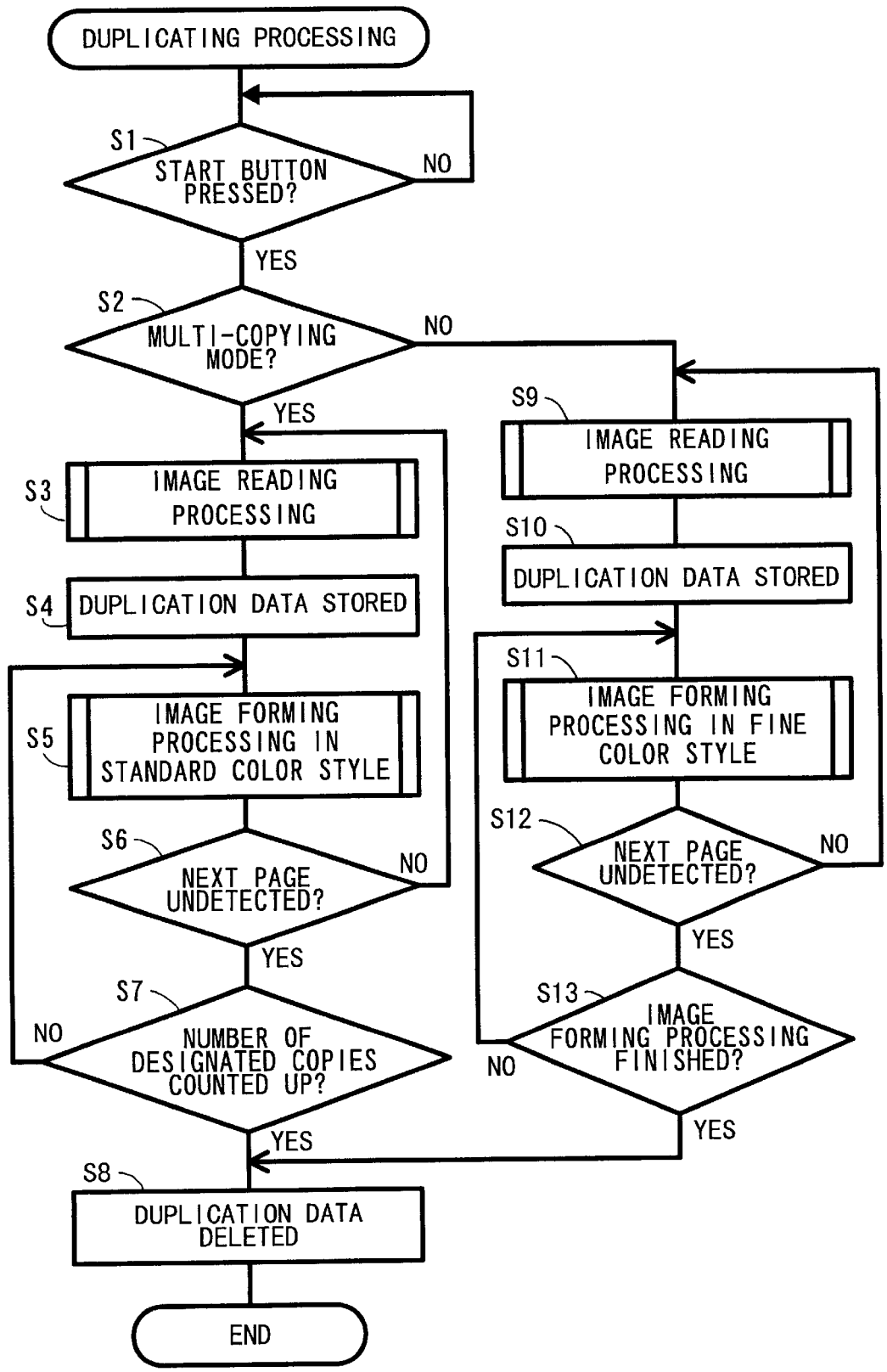
FIG. 2 is a flowchart illustrating duplicating operations by a facsimile machine.

A first embodiment of the invention will be described with reference to FIG. 2. When an original detection sensor (not shown) detects that an original is set, the CPU 1 accepts various inputs, such as copying mode changes and the number of copies to be produced, and waits for a user to press a start button (S1). When the start button is pressed (YES in S1), it is determined whether or not the setting copy mode is the multi-copying mode (S2). In the multi-copying mode, the number of copies to be designated by the user is set to 2 or more, and Y copies of X pages of the original are produced using the stack or sort copying methods. The duplicating operations by the facsimile machine are further described below when duplicating is performed, for example, using the sort copying method. When it is determined that the copying mode is set in the multi-copying mode (YES in S2), the CPU 1 starts the image reading processing (S3). At this time, images are read from an original by the image reading unit 11. The CPU 1 generates the duplication data based on the images read as described above. In this embodiment, since the standard color style (described below) is automatically selected when the multi-copying mode is set, the duplication data to be handled in the standard color style is generated. To produce Y copies of X pages of the original in the multi-copying mode, the CPU 1 sequentially stores the duplication data for X pages of the original in the free space in the RAM 3 (S4). The duplication data according to the standard color style, for example, four CMYK ink colors, is stored in the RAM 3. While storing the necessary duplication data in the RAM 3, the CPU 1 starts the image forming processing for duplication in the standard color style (S5). At this time, the color images are started to be formed by the image forming unit 12 using, for example, the four CMYK ink colors. The CPU 1 also starts counting the number of copies produced.

After starting the image forming processing for duplication, the CPU 1 detects whether or not the next page of the original is set (S6). When the next page of the original is undetected (YES in S6), that is, the next page of the original is not set, the CPU 1 then determines whether or not the number of copies produced is counted up to the designated number Y. When the number of copies produced is counted up to the designated number Y (YES in S7), the duplication data stored in RAM 3 is deleted (S8). Then, the main program as to the duplicating processing is finished executing. The duplication data stored in the RAM 3 may be deleted at one time after the designated number of copies are produced and counted up, or every time the duplication data becomes unnecessary.

If the number of copies is not counted up to the designated number Y (NO in S7), the CPU 1 continues the image forming processing for the remaining copies in the step S5.

When the next page of the original is not undetected (NO in S6), that is, the next page of the original is set, the CPU 1 starts the image reading processing for the detected page of the original in the step S3.

When the copying mode set by the user is not the multi-copying mode (NO in S2), that is, the single-copying mode is set, the CPU 1 starts the image reading processing (S9), similar to the step S3 described above. In this embodiment, since the fine color style (described below) is automatically selected when the single-copying mode is set, the duplication data to be handled in the fine color style is generated. The CPU 1 stores such duplication data temporarily in the free space in the RAM 3 (S10). The duplication data according to the fine color style, for example, six ink colors adding the particular two ink colors to the four CMYK ink colors, is stored in the RAM 3. While storing the necessary duplication data in the RAM 3, the CPU 1 starts the image forming processing in the fine color style (S11). At this time, the color images are started to be formed by the image forming unit 12 using the six ink colors of the CMYK and two more particular ink colors.

Similar to the step S6, the CPU 1 detects whether or not the next page of the original is set (S12). When the next page of the original is undetected (YES in S12), that is, the next page of the original is not set, the CPU 1 determines whether or not the image forming processing for all the duplication data is finished (S13). If the image forming processing for all the duplication data is finished (YES in S13), the duplication data stored in the RAM 3 is deleted (S8). Then, the main program as to the duplicating processing is finished executing. Since the duplication data become unnecessary once images are formed by the image forming unit 12 in the single-copying mode, the unnecessary data is sequentially deleted from the RAM 3, and the new duplication data is stored therein. Therefore, the space to be used in the RAM 3 will be able to be minimized.

When the image forming processing is not finished (NO in S13), the CPU 1 continues the image forming processing for the remaining duplication data in the step S11. When the next page of the original is not undetected (NO in S12), that is, the next page of the original is set, the CPU 1 starts the image reading processing in the step S9 and continues according to the following steps.

As described above, in the facsimile machine of the first embodiment, duplicating in the single-copying mode where the duplication data for one page of an original is formed into images on a sheet of the recording paper, is started in the fine color style wherein the amount of duplication data to be processed becomes greater than when it is processed using the standard CMYK four ink colors. On the other hand, duplicating in the multi-copying mode where the duplication data for a page of an original is formed into images on the sheets of the recording paper, is started in the standard color style wherein the duplication data is processed using the four CMYK ink colors. Therefore, the duplication data processed in each copying mode is optimized so that all the duplication data can be stored in the RAM 3. Especially, the number of ink colors to be used is limited to the standard ink colors in the multi-copying mode, so that the size of the duplication data can be minimized. Consequently, the space in the RAM 3 occupied by the duplication data is reduced as much as possible. The duplicating operations in each copying mode can be stably performed, without increasing the memory size of the RAM 3 and its costs.

In the above-described first embodiment, when it is determined in the step S2 that the copying mode is set in the single-copying mode, the fine color style is automatically selected in the step S9. However, it is possible for a user to preset which of the standard color style or the fine color style is used for various types of processing that activate the image forming unit 12, including the duplicating processing as shown in FIG. 2. In such cases, the duplicating processing as shown in FIG. 2 is performed in the color style that the user sets. However, the following construction can be employed to prevent all the spaces in the RAM 3 from being occupied by the duplication data. When the fine color style is set by the user in the multi-copying mode, the color style may be forcibly changed to the standard color style to stably perform the duplicating processing, and when the single-copying mode is set, the color style that the user sets may be used for the duplicating processing.

In the above-described construction, since the color style that the user sets is used for duplicating processing, the duplication quality that meets the user's needs will be produced. Even when the fine color style is set for the multi-copying mode, the color style is forcibly changed to the standard color style, so that the size of the duplication data can be minimized. Therefore, all the spaces in the RAM 3 will not be occupied by the duplication data, and the duplicating processing can be stably performed in the multi-copying mode.

Figure 3:
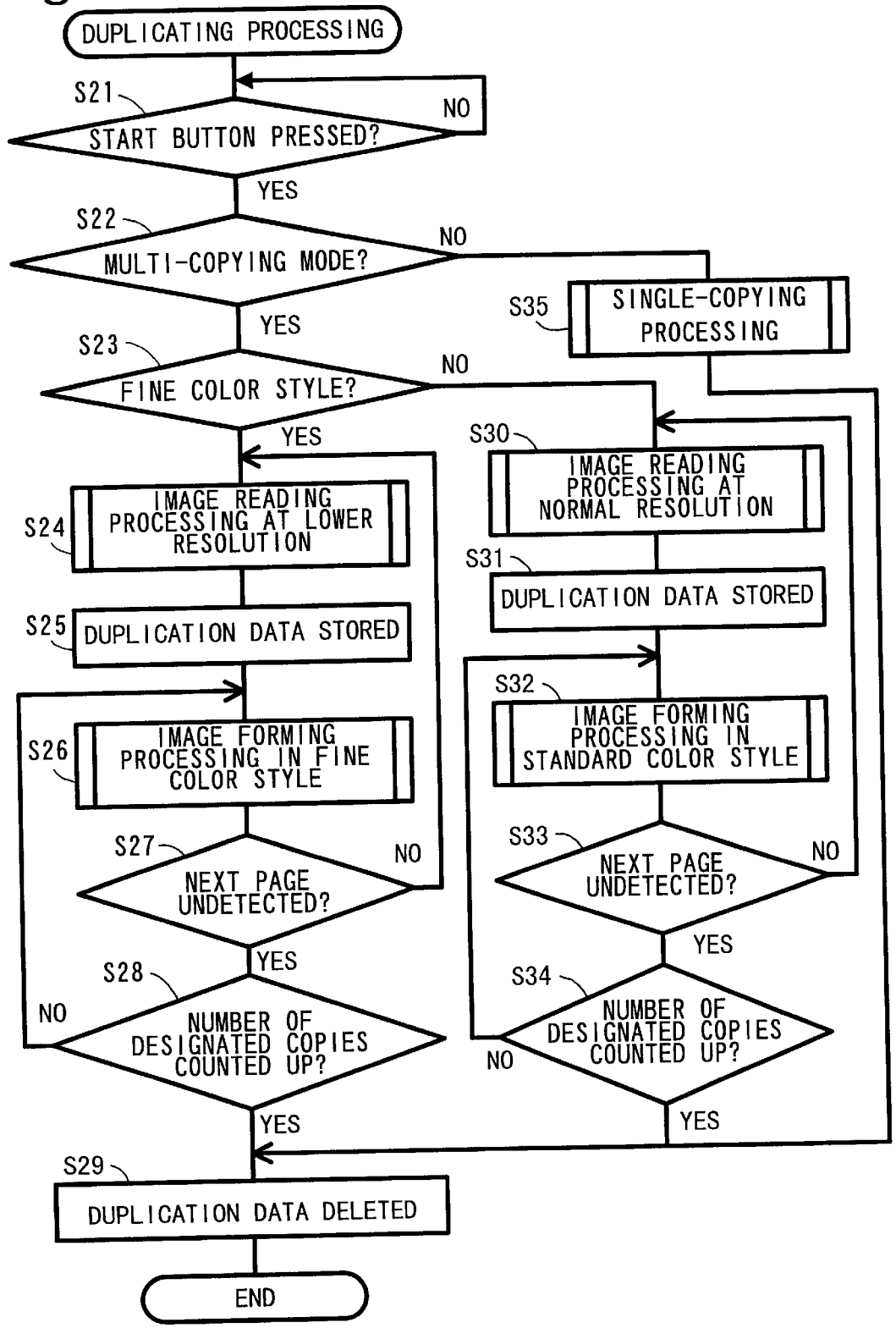
FIG. 3 is a flowchart illustrating duplicating operations by the facsimile machine.

A second embodiment of the invention will be described below with reference to FIG. 3. In this embodiment, a user sets in the initial setting which of the standard color style or the fine color style is used, before starting the duplicating processing. The setting is made using the control panel 13 and the setting data is stored in the EEPROM 6.

Similar to the first embodiment, the CPU 1 waits for the user to press a start button (S21). When the start button is pressed (YES in S21), it is determined whether or not the setting copying mode is the multi-copying mode (S22). When it is determined that the copying mode is set in the multi-copying mode (YES in S22), the CPU 1 then determines whether or not the setting color style is the fine color style (S23). When CPU 1 determines that the fine color style is set (YES in S23), the image reading processing is started to be performed at a resolution lower than the normal setting (S24). At this time, the images are read from an original by the image reading unit 11 at a lower resolution. The CPU 1 generates the duplication data to be handled in the fine color style, based on the images read at a lower resolution and which are less detail.

To produce Y copies of X pages of the original in the multi-copying mode, the CPU 1, which have generated the duplication data according to the fine color style, sequentially stores the duplication data for X pages of the original in the free space in the RAM 3 (S25). The duplication data according to the fine color style wherein the six colors of for example, the standard CMYK ink colors and the particular two ink colors are used, is stored in the RAM 3. Using such duplication data, the duplicating processing is performed to produce the designated number of copies (S26 to S29).

When it is determined that the setting color style is not the fine color style (NO in S23), that is, the color style is set in the standard color style, the image reading processing is started at the normal setting resolution (S30). At this time, the images are read from an original by the image reading unit 11 at the normal setting resolution. The CPU 1 generates the duplication data to be handled in the standard color style, based on the images read at the normal setting resolution. To produce Y copies of X pages of the original in the multi-copying mode, the CPU 1 stores the duplication data for X pages of the original sequentially in the free space in the RAM 3 (S31). The duplication data according to the standard color style wherein the standard four CMYK ink colors, for example, are used, is stored in the RAM 3. Using such duplication data, the duplicating processing is performed to produce the designated number of copies (S32 to S34, and S29).

When it is determined that the setting copy mode is not the multi-copying mode (NO in S22), that is, the copying mode is set in the single-copying mode, the single-copying processing is performed (S35). The steps conducted for the single-copying processing correspond to S9 to S13, and S8 of FIG. 2 which is referred to when the first embodiment is explained. In the step S11, the image forming processing is performed based on the color style setting stored in the EEPROM 6.

In the facsimile machine of the second embodiment, even when duplicating in the multi-copying mode is performed in the fine color style, the resolution of the duplication data is reduced from that of duplication data obtained by the images read at the normal setting resolution. Therefore, the size of the duplication data can be minimized and the situation that all the spaces in the RAM 3 are occupied by the duplication data, can be prevented. Consequently, the duplicating operations wherein the great amount of the duplication data is required to be processed via the RAM 3, can be stably performed, without increasing the memory size of the RAM 3 and its costs.

Since duplicating is performed based on the color style that the user sets, the duplication quality that meets the user's needs will be produced. Even when the fine color style is set for the multi-copying mode, the resolution of the duplication data is automatically reduced from that of duplication data to be duplicated in the standard color style, so that the size of the duplication data will be minimized. Therefore, all the spaces in the RAM 3 will not be occupied by the duplication data, and the duplicating processing can be stably performed in the multi-copying mode based on the color style set by the user.

Figure 4:
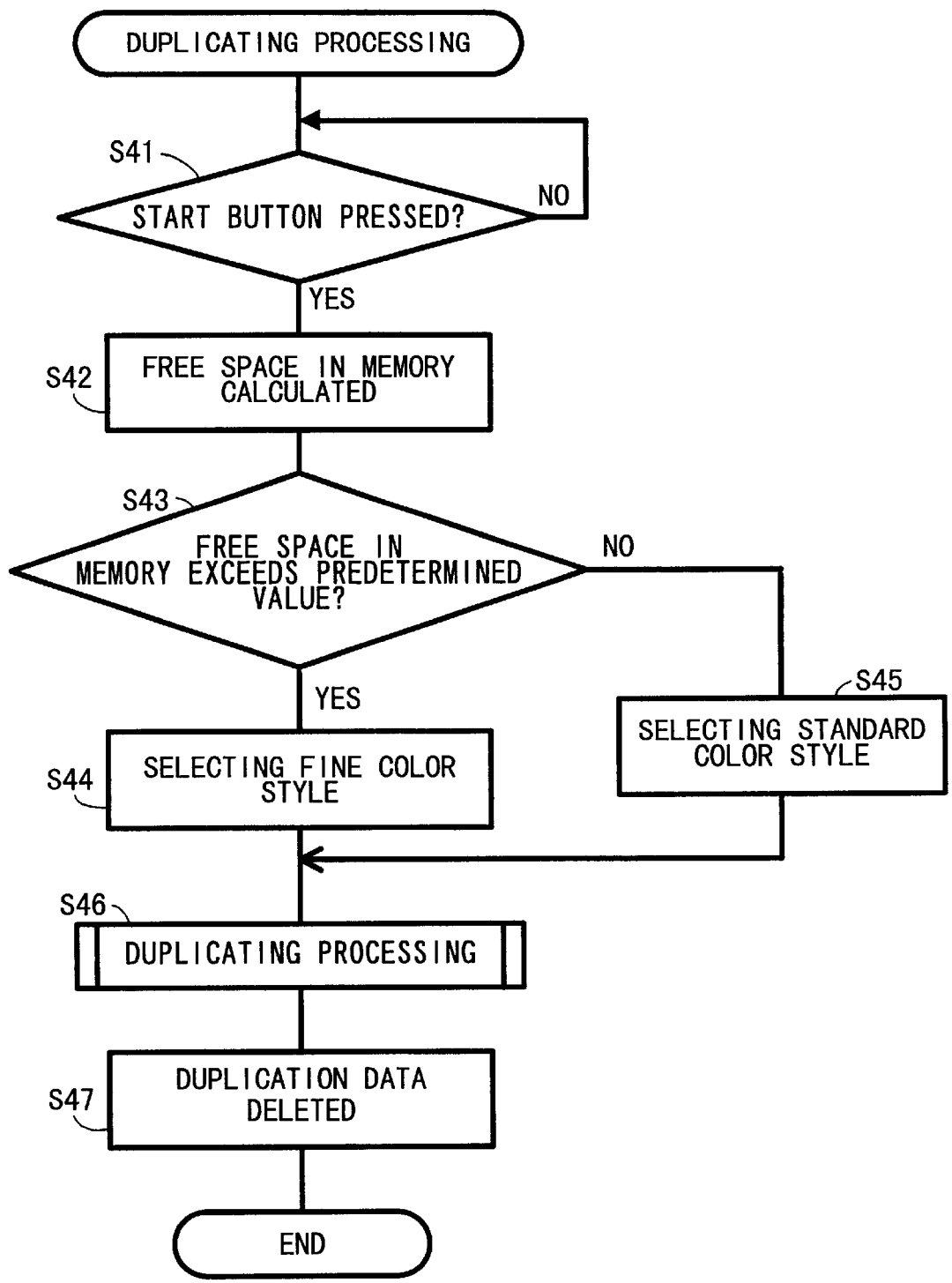
FIG. 4 is a flowchart illustrating duplicating operations by the facsimile machine.

A third embodiment will be described below with reference to FIG. 4. Similar to the first embodiment, the CPU 1 waits for a user to press the start button (S41). When the start button is pressed (YES in S41), the amount of free space in the RAM 3 storing various data, is calculated (S42). The amount of free space in the RAM 3 is obtained by excluding spaces secured for the operations by the CPU 1, and in which the sound data or the image data based on the message recording functions or the memory timer transmission functions, is stored.

The CPU 1 calculates the amount of free space in the RAM 3 and compares the obtained amount of free space in the RAM 3 with the predetermined value (S43). The predetermined value used as the reference comparison value, is a threshold value determined based on the minimum free space in the memory required for the image forming processing to be performed in the fine color style. For reference, this is not the threshold value but approximately hundreds of kilobyte of free space are required to store the duplication data to be used for the image forming processing in the fine color style.

When the free space available in the memory exceeds the predetermined value (YES in S43), the CPU 1 selects the fine color style (S44), and starts the duplication processing according to the fine color style (S46 to S47). The duplication processing is performed in the fine color style regardless of which of the single-copying mode or the multi-copying mode is set, when the free space available in the memory exceeds the predetermined value. Since the duplication processing is performed in the same manner as described in the first and second embodiments, its explanation is omitted for the third embodiment.

When the free space available in the memory does not exceed the predetermined value (NO in S43), the CPU 1 selects the standard color style (S45), and starts the duplication processing according to the standard color style (S46 to S47). The duplication processing is performed in the standard color style regardless of which of the single-copying mode or the multi-copying mode is set, when the free space available in the memory is below the predetermined value.

In the facsimile machine of the third embodiment, when the free space available in the memory is compared with the predetermined value and do not exceed the predetermined value, duplicating is performed not in the fine color style but in the standard color style. Therefore, the situation that the RAM 3 cannot store all the duplication data due to the small amount of free space available in the memory, can be prevented. Consequently, the duplicating operations required via the RAM 3 can be stably performed, without increasing the memory size of the RAM 3 and its costs.

Figure 5:
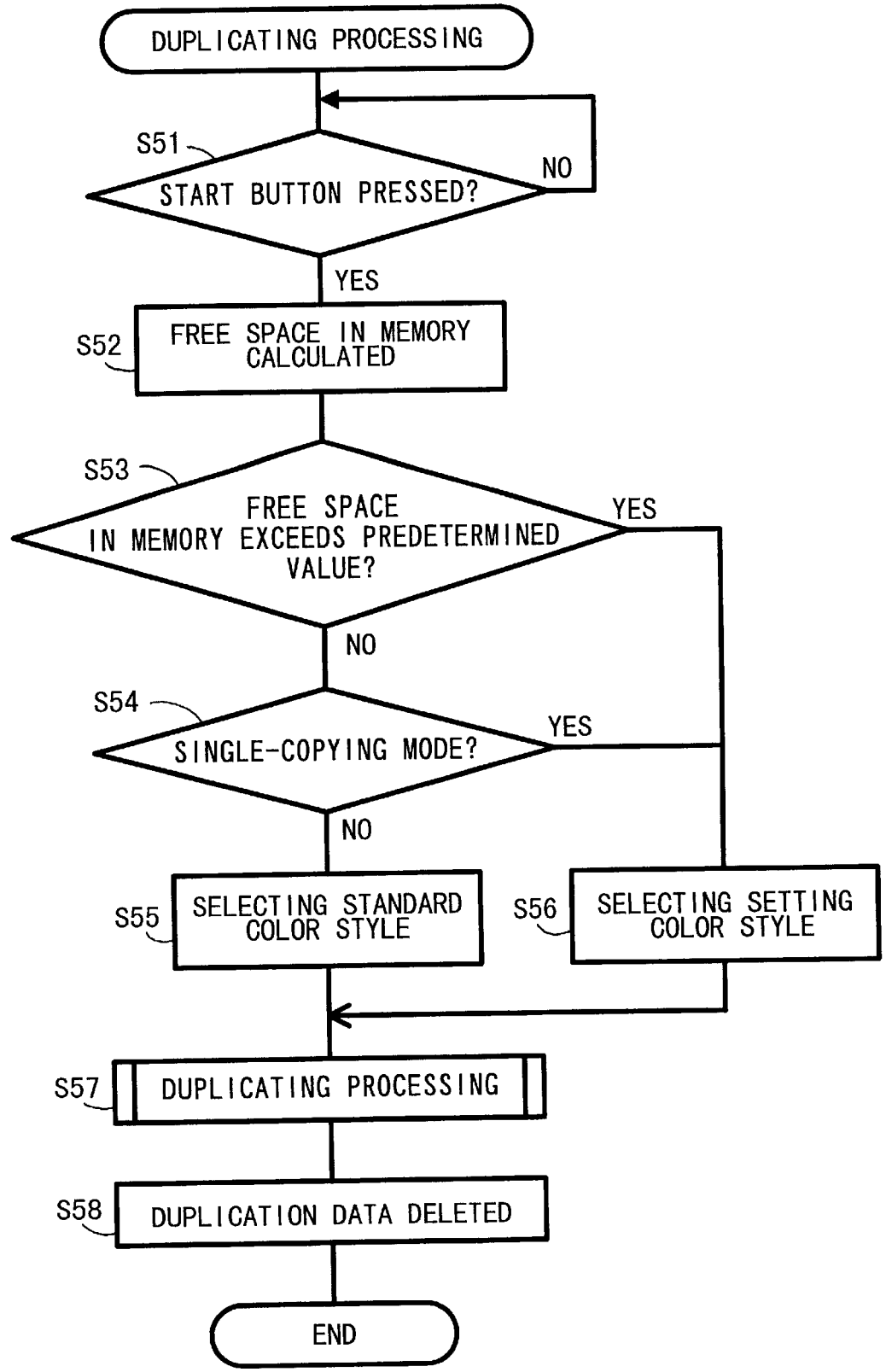
FIG. 5 is a flowchart illustrating duplicating operations by the facsimile machine.

In the third embodiment, when it is determined in the step S43 that the amount of free space available in the RAM 3 is below the predetermined value, the standard color style is automatically selected in the step S45. However, if a user is able to select which of the standard color style or the fine color style is used for duplication even when the amount of free space free space available in the RAM 3 is below the predetermined value, the duplicating processing will be performed as shown in FIG. 5.

When the start button is pressed (YES in S51), the free space available in the RAM 3 is calculated (S52). When the calculated amount of free space in the RAM 3 exceeds the predetermined value (YES in S53), the color style that the user sets is selected (S56) regardless of the setting copying mode. Accordingly, the duplication processing is performed (S57 to S58). When the calculated amount of free space in the RAM 3 does not exceed the predetermined value (NO in S53), the CPU 1 then determines whether or not the setting copying mode is the single-copying mode (S54). When it is determined that the copying mode is set in the single-copying mode (YES in S54), the duplicating processing is performed in the color style that the user sets (S56 to S58), since the amount of memory to be used for the duplicating processing in the single-copying mode is relatively small. When it is determined that the setting copying mode is not the single-copying mode (NO in S54), that is, the copying mode is set in the multi-copying mode, the standard color style is forcibly selected (S55) to prevent any troubles due to the small amount of free space available in the RAM 3. Accordingly, the duplicating processing is performed (S57 to S58).

In the above-described construction, duplicating is performed in the color style that the user sets when enough free space is available in the RAM 3, or when the copying mode is set in the single-copying mode even if the amount of free space available in the memory is below the predetermined value. Therefore, the duplication quality that meets the user's needs will be produced. If the copying mode is set in the multi-copying mode when the amount of free space available in the memory is below the predetermined value, the standard color style is forcibly selected even when the user selects the fine color style. Therefore, the situation that all the spaces in the RAM 3 occupied by the duplication data can be prevented. Consequently, the duplicating operations in the multi-copying mode can be stably performed.

Figure 6:
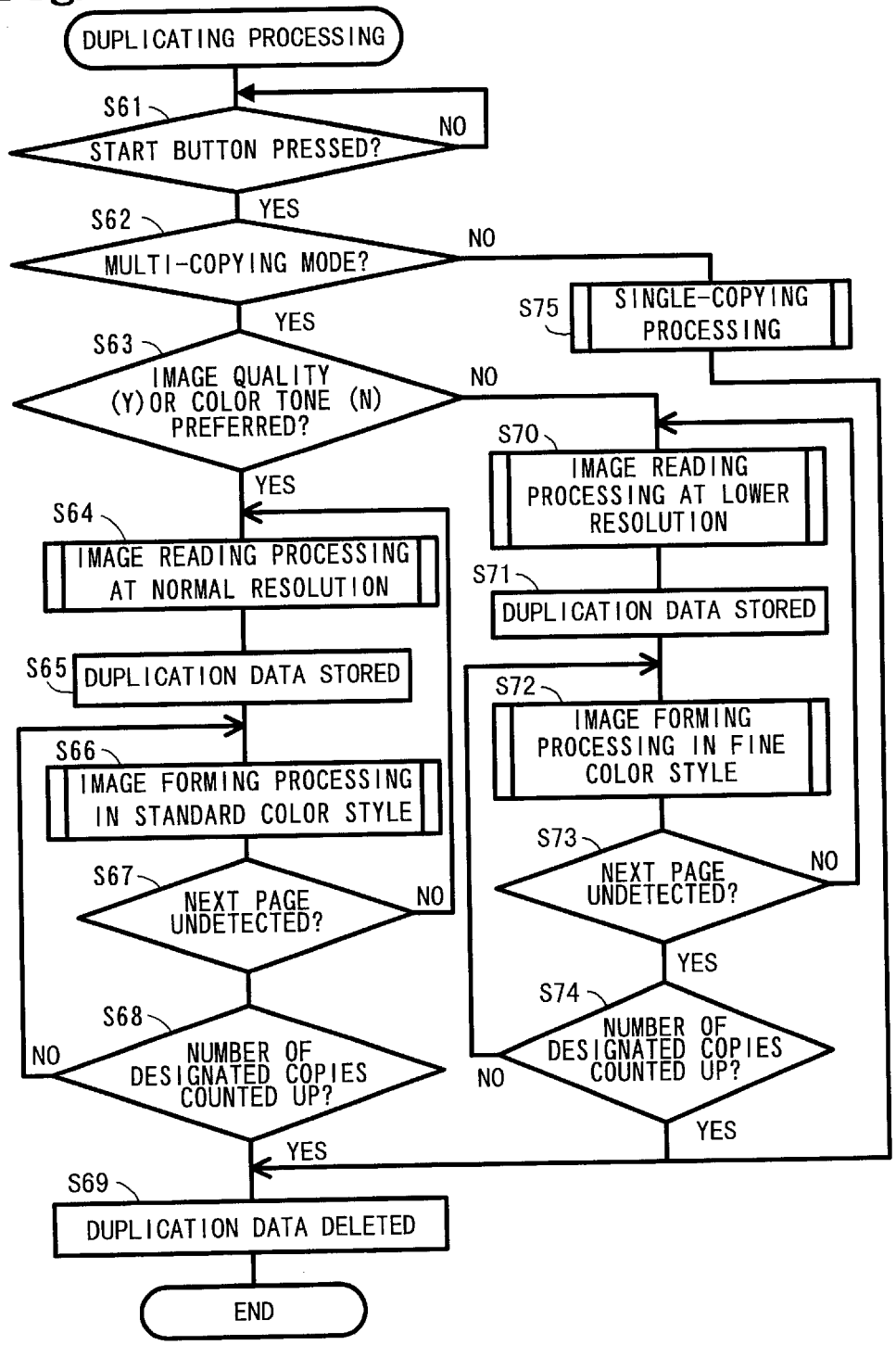
FIG. 6 is a flowchart illustrating duplicating operations by the facsimile machine.

A fourth embodiment will be described below with reference to FIG. 6. This embodiment incorporates the points of each of the three embodiments.

Similar to the other embodiments, the CPU 1 waits for a user to press a start button (S61). When the start button is pressed (YES in S61), the CPU 1 determines whether or not the copying mode set by the user is the multi-copying mode (S62). When it is determined that the copying mode is set in the multi-copying mode (YES in S62), the CPU 1 then determines which of the "image quality preferred" or "color tone preferred" is selected by the user. When it is determined that the "image quality preferred" is selected (YES in S63), the CPU 1 performs the image reading processing at the normal setting resolution (S64). At this time, images are read from an original by the image reading unit 11 at the normal setting resolution. The CPU 1 generates the duplication data to be handled in the standard color style, based on the images read at the normal setting resolution. The CPU 1 stores such duplication data in the free space in the RAM 3 (S65). Using such duplication data, the duplicating processing is performed in the standard color style to produce the designated number of copies (S66 to S69), similar to the above-described other embodiments.

When it is determined that the "image quality preferred" is not selected (NO in S63), but the "color tone preferred" is, the CPU 1 performs the image reading processing at a resolution lower than the normal setting resolution (S70). At this time, images are read from an original by the image reading unit 11 at a resolution lower than the normal setting resolution. The CPU 1 generates the duplication data to be handled in the fine color style, based on the images read at a lower resolution and which are less detail. Using such duplication data, the duplicating processing is performed in the fine color style to produce the designated number of copies (S72 to S74, and S69), similar to the above-described other embodiments.

When it is determined that the copying mode set by the user is not the multi-copying mode (NO in S62), the duplicating processing is performed in the single-copying mode (S75). The steps conducted for the single-copying processing correspond to S9 to S13, and S8 of FIG. 2 which is referred to when the first embodiment is explained.

In the facsimile machine of the fourth embodiment, duplicating is stably performed in the multi-copying mode by selecting either the standard color style wherein the number of colors to be used is limited though the image quality is preferred, or the fine color style wherein images are read at a resolution lower than the normal setting though the color tone is preferred. The user can selects which of the image quality or the color tone is preferred before starting duplicating in the multi-copying mode. In either way, the situation that all the spaces in the RAM 3 occupied by the duplication data, can be prevented. Consequently, the duplicating operations can be stably performed in the multi-copying mode.

The main point of an fifth embodiment will be briefly described below. When a facsimile device is used as a copying machine, the image reading unit 11 generates input image signals. The input image signals are A/D converted by the gate array 7.

Thereafter, the CPU 1 conducts various correction processing for the input image data. The data is finally used as the output image data for image forming processing, via the RAM 3. The input resolution when images are read from an original by the image reading unit 11 can be variably controlled. The color tone correction processing for the input image data is made with respect to the gamma correction, contrast, and brightness. When the CPU 1 conducts the correction processing as to the color tones, the correction table stored in the EEPROM 6 according to the number of color inks to be used, is referred to. The input resolution which affects the quality of the images may be changed by adjusting the feeding or travelling speeds of an original or an image sensor along the sub scanning direction, or by performing the linear interpolation processing for the pixel line data obtained along the main scanning direction.

In the above-structured facsimile machines, when the four colors of inks are set, the CPU 1 conducts the various processing based on the standard color designation conditions written into the EEPROM 6. When the six colors of inks are set, the CPU 1 conducts the various processing based on the fine color designation conditions written into the EEPROM 6. The each designation condition includes the correction table that the CPU 1 is to refer to according to the number of ink colors to be used and the input resolution designation. The CPU 1 performs the processing based on the designated conditions, and the images are formed with the superior color tone and quality, according to the number of ink colors to be used.

Figure 7:
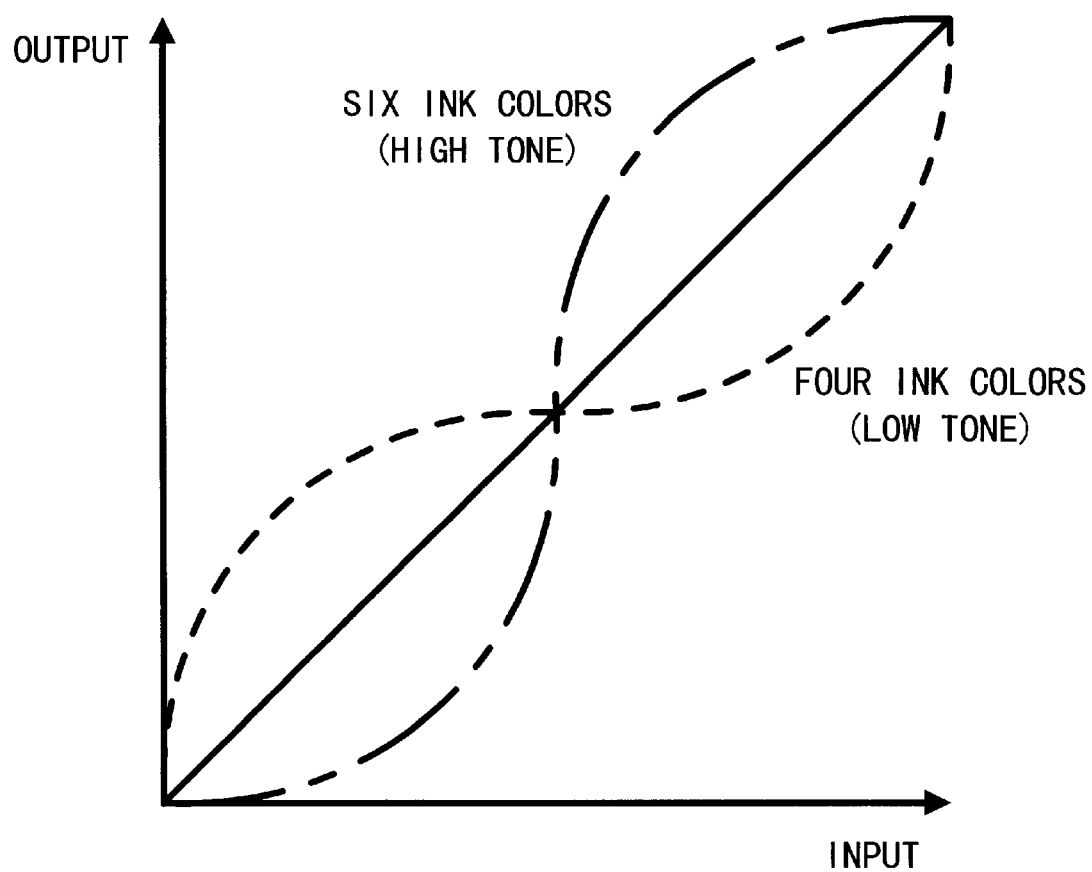
FIG. 7 is a figure explaining the gamma correction table to be used when the CPU performs the color tone correction.

FIG. 7 is a figure given for the explanation of the gamma correction table to be used when the CPU performs the color tone correction. The gamma correction table given in FIG. 7 is used for the adjustment of the input/output characteristics to produce the images with the natural brightness or contrast when the output image data is obtained from the input image data. For example, when the input and output characteristics are in a one-to-one relationship, the CPU 1 prepares the output image data out of the input image data, based on the solid line shown in FIG. 7. When the color images are formed using four ink colors, the CPU 1 prepares the output image data out of the input image data, based on the chain line curve shown in FIG. 7, so that the color tone of the images becomes low. When the color images are formed using six ink colors, the CPU 1 prepares the output image data out of the input image data, based on the alternate long and short dash line curve shown in FIG. 7, so that the color tone of the images becomes high, since the images softer than when they are formed using four ink colors, may be formed using six ink colors.

The CPU 1 realizes a ink color use detecting device that detects which of the standard ink colors or more ink colors than the standard ink colors, are to be used, and an image data preparing device that prepares an image data based on the standard color designation conditions suitable for the standard ink colors when the ink color use detecting device detects that the standard ink colors are to be used, and that prepares the image data based on the fine color designation conditions suitable for more ink colors than the standard ink colors when the ink color use detecting device detects that more ink colors than the standard ink colors are to be used.

The ROM 5 is a storage medium that stores programs for controlling an image forming apparatus capable of forming images onto a recording paper using standard ink colors or using more ink colors than the standard ink colors and capable of processing image data for the image forming processing. The ROM 5 realizes a ink color use detecting program for detecting which of the standard ink colors or more ink colors than the standard ink colors, are to be used, and an image data preparing program for preparing an image data based on the standard color designation conditions suitable for the standard ink colors when it is detected based on the ink color use detecting program that the standard ink colors are to be used, and for preparing the image data based on the fine color designation conditions suitable for more ink colors than the standard ink colors when it is detected based on the ink color use detecting program that more ink colors than the standard ink colors are to be used.

Figure 8:
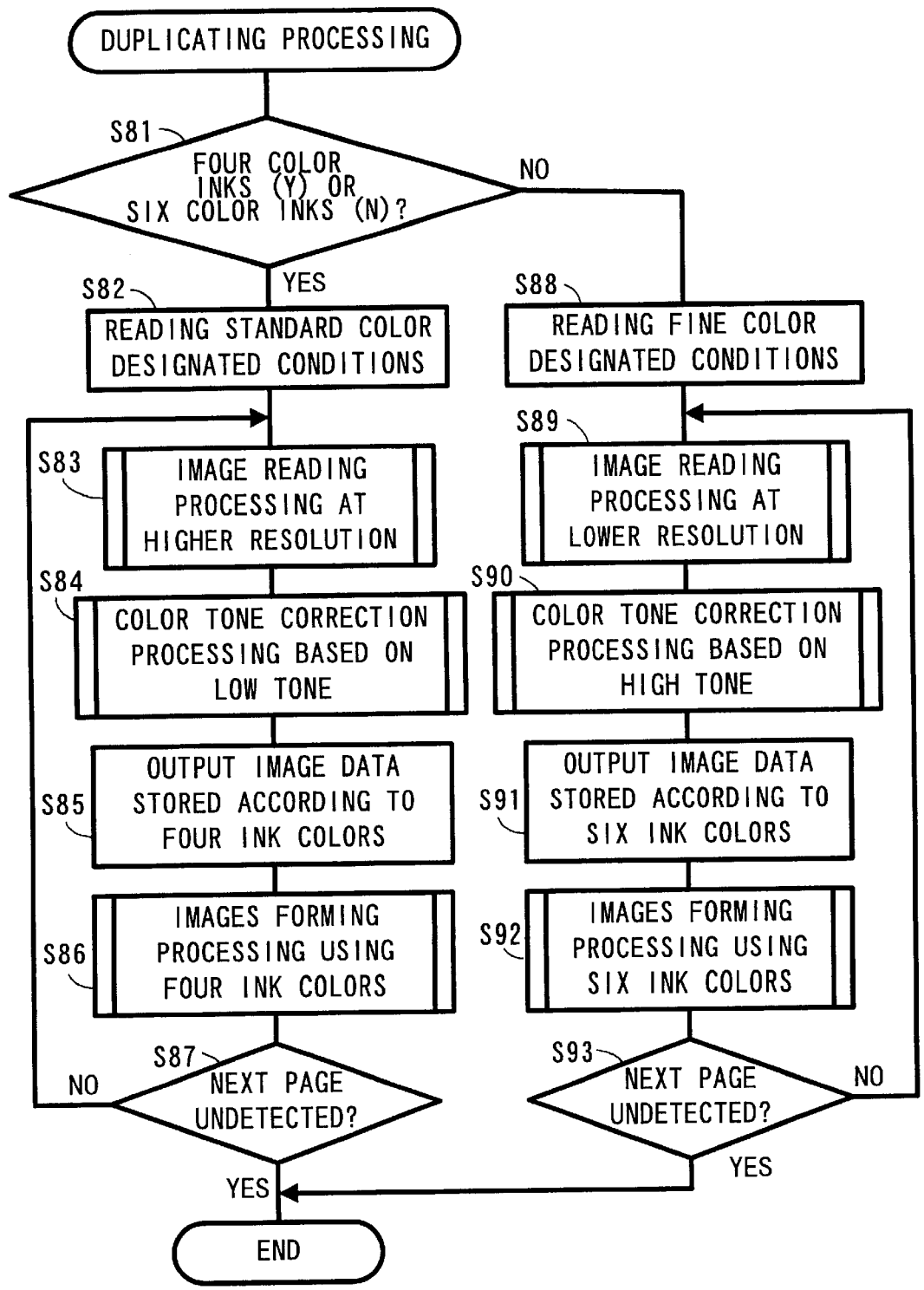
FIG. 8 is a flowchart illustrating duplicating operations by the facsimile machine.

The fifth embodiment will be described below reference to FIG. 8. FIG. 8 is a flowchart illustrating the duplicating operations by a facsimile machine. As shown in the figure, when the duplicating process is started, the CPU 1 detects which of the four ink colors or the six ink colors is to be used (S81) by the sensor 17.

When the four ink colors are used (YES in S81), the CPU 1 reads the standard color designation conditions stored in the EEPROM 6 and sets the color tone correction table and the input resolution designated by the standard color designation conditions (S82). In this case, for the color tone correction table, the predetermined gamma correction table for four ink colors such as shown in FIG. 7, suitable for image forming using four ink colors, is used. For the input resolution which determines the image quality level, a resolution higher than when six ink colors are used, is employed. When the images are formed using four ink colors, the color tone of the images becomes higher than when the images are formed using six ink colors. Therefore, the higher resolution is employed to make the high-colored images scumble or soften. The steps S81 and S82 may be performed when a user sets the ink cartridge in the printer before the duplicating processing is performed.

After reading the standard color designation conditions, the CPU 1 starts the image reading processing at a higher resolution (S83). At this time, the images are read at a higher resolution from an original by the image reading unit 11. The CPU 1 temporarily stores the digital input image data in the RAM 3.

Thereafter, the CPU 1 performs the color tone correction processing based on the low tone for the obtained input image data using such as gamma correction table for four ink colors (S84). The CPU 1 generates the output image data according to the four ink colors, so as to be used for the image forming processing. The CPU 1 then stores such output image data in the RAM 3 (S85).

Thereafter, while controlling the image forming unit 12 to eject four color inks to form color images based on the output image data according to four ink colors stored in the RAM 3, the CPU 1 performs the images forming processing (S86). Accordingly, the color images are formed onto the recording paper using the four CMYK ink colors.

After the image forming processing is finished, the CPU 1 detects in the image reading unit 11 whether the next page of the original is set (S87). When the next page of the original is undetected (YES in S87), that is, the next page of the original is not set, the CPU 1 finishes executing the main program as to the duplicating processing.

When the next page of the original is not undetected (NO in S87), that is, the next page of the original is set, the CPU 1 starts the image reading processing at a higher resolution in the step 83 and continues the duplicating processing, similar to the duplicating processing performed for the previous page of the original.

When six ink colors are used (NO in S81), the CPU 1 reads the fine color designation conditions stored in the EEPROM 6 and sets the color tone correction table and input resolution designated by the fine color designation conditions (S88). In this case, for the color tone correction table, the predetermined gamma correction table for six ink colors such as shown in FIG. 7, suitable for image forming using six ink colors, is used. For the input resolution which determines the image quality level, a resolution lower than when four ink colors are used, is employed. When the images are formed using six ink colors, the color tone of the images becomes softer than when the images are formed using four ink colors. Therefore, such higher resolution as when the four ink colors are used, is not necessary, but the vivid image quality is obtained.

After reading the fine color designation conditions, the CPU 1 starts the image reading processing at a lower resolution (S89). At this time, the images are read at a lower resolution from an original by the image reading unit 11. The CPU 1 temporarily stores the digital input image data in the RAM 3.

Thereafter, the CPU 1 performs the color tone correction processing based on the high tone for the obtained input image data using such as gamma correction table for six ink colors (S90). The CPU 1 generates the output image data according to the six ink colors, so as to be used for the image forming processing. The CPU 1 then stores such output image data in the RAM 3 (S91).

Thereafter, while controlling the image forming unit 12 to eject six color inks to form color images based on the output image data according to six ink colors stored in the RAM 3, the CPU 1 performs the images forming processing (S86). Accordingly, the color images are formed onto the recording paper using the six ink colors of the four CMYK ink colors and two more particular ink colors.

After the image forming processing is finished, the CPU 1 detects in the image reading unit 11 whether or not the next page of the original is set (S93), as similar to the step S87. When the next page of the original is undetected (YES in S93), that is, the next page of the original is not set, the CPU 1 finishes executing the main program as to the duplicating processing.

When the next page of the original is not undetected (NO in S93), that is, the next page of the original is set, the CPU 1 starts the image reading processing at a lower resolution in the step S89 and continues the duplicating processing, similar to the duplicating processing performed for the previous page of the original.

In the facsimile machine having the above-described constructions and performing the above-described operations, when the images are formed using the standard four CMYK ink colors, images are prepared based on the standard color designation conditions. When the images are formed using six ink colors of the standard four ink colors and particular two ink colors, the images are prepared based on the fine color designation conditions. The designation conditions are automatically changed according to the number of ink colors to be used, and the image data is optimized by the designated condition according to the number of ink colors to be used. Using such optimized image data, the image forming processing is performed. Therefore, the ideal images quality can be obtained without requiring any complicated processing, when the images are reproduced according to the number of ink colors to be used.

While the invention has been described with reference to the embodiments, it is to be understood that the invention is not restricted to the particular forms shown in the foregoing embodiments. Various modifications and alternations can be made thereto without departing from the scope of the invention.

In the above-described embodiments, the duplication can be performed in the standard color style or in the fine color style. However, duplication may be performed in colors or in monochrome. The invention is described in conjunction with the image forming processing for duplication in the standard color style using the standard four CMYK ink colors, or in the fine color style using the six ink colors of the standard four CMYK ink colors and the particular two ink colors, but may also be applied if duplicating may be performed with color styles changed according to the number of colors to be used.

While the invention is described in conjunction with the duplicating processing, it may also be applied to the processing of image forming onto the recording paper based on the image data from the PC 20.

Also, the invention is not limited to the facsimile apparatus but may also be applied to a printer being used as the periphery equipment of a general personal computer, and a video printer that is connected to a television or a video camera and outputs the images of the still pictures on the monitor.

As is apparent from the foregoing description, according to one aspect of the invention, duplicating in the single-copying mode where images read from the original are duplicated on a sheet of the recording paper, is started in the fine color style wherein the amount of duplication data to be processed becomes greater than when it is processed using the standard ink colors, and duplicating in the multi-copying mode where images read from the original are duplicated on the sheets of the recording paper, is started in the standard color style wherein the duplication data is processed using the standard ink colors. Therefore, the duplication data processed in each copying mode is optimized so that all the duplication data can be stored in the memory. Especially, the number of ink colors to be used is limited to the standard ink colors in the multi-copying mode, so that the size of the duplication data can be minimized. Consequently, the space in the memory occupied by the duplication data is reduced as much as possible. The duplicating operations in each copying mode can be stably performed, without increasing the memory size and its costs.

Also, in the invention, since the color style that the user sets is used for duplicating in the single-copying mode, the duplication quality that meets the user's needs will be produced. Even when the fine color style is set for the multi-copying mode, the color style is forcibly changed to the standard color style, so that the size of the duplication data can be minimized. Therefore, all the spaces in the memory will not be occupied by the duplication data, and the duplicating processing can be stably performed in the multi-copying mode.

Further, in the invention, even when duplicating in the multi-copying mode is performed in the fine color style, the resolution of the duplication data is reduced from that of duplication data obtained by the images read at the normal setting resolution. Therefore, the size of the duplication data can be minimized by reducing resolution of the duplication data, and the situation that all the spaces in the memory are occupied by the duplication data, can be prevented. Consequently, the duplicating operations wherein the great amount of the duplication data is required to be processed via the memory, can be stably performed, without increasing the memory size and its costs.

Since duplicating is performed based on the color style that the user sets, the duplication quality that meets the user's needs will be produced. Even when the user sets the fine color style in the multi-copying mode, the resolution of the duplication data is automatically reduced, so that the size of the duplication data will be minimized. Therefore, all the spaces in the memory will not be occupied by the duplication data, and the duplicating processing can be stably performed in the multi-copying mode based on the color style set by the user.

Further, in the invention, duplicating in the multi-copying mode may be performed by selecting either the standard color style wherein the number of colors to be used is limited though the image quality is preferred, or the fine color style for which images are read at a resolution lower than the normal setting though the color tone is preferred. Therefore, a user can obtain the designated number of copies in the multi-copying mode by selecting which of the image quality or the color tone is preferred.

Since duplicating is performed not in the fine color style but in the standard color style when the free space available in the memory do not exceed the predetermined value, the situation that the memory cannot store all the duplication data due to the small amount of free space available in the memory, can be prevented. Consequently, the duplicating operations required via the memory can be stably performed, without increasing the memory size and its costs.

Even when the free space available in the memory is below the predetermined value, duplicating in the single-copying mode is performed in the color style set by the color style setting device. Therefore, the duplication quality that meets the user's needs will be produced. When the free space available in the memory do not exceed the predetermined value, duplicating in the multi-copying mode is performed by forcibly selecting the standard color even when the fine color style is set. Therefore, all the spaces in the memory will not be occupied by the duplication data, and the duplicating processing can be stably performed in the multi-copying mode.

According to the another aspect of the invention, by activating the CPU based on the stored program, achieved is the operations of an image duplicating apparatus such as starts duplicating in the fine color style when it is determined that the single-copying mode is set, and starting duplicating in the standard color style when it is determined that the multi-copying mode is set.

Also, by activating the CPU based on the stored program, achieved is the operations of an image duplicating apparatus such as reducing the resolution of a duplication data from the normal setting resolution when it is determined that the multi-copying mode is set and starting duplicating in the fine color style.

Further, by activating the CPU based on the stored program, achieved is the operations of an image duplicating apparatus, such as avoiding duplicating in the fine color style and starting duplicating in the standard color style when the amount of free space available in the memory is below the predetermined value.

In the image forming apparatus of the invention, when images are formed using the standard ink colors, image data is prepared based on the standard color designation conditions. On the other hand, when the images are formed using more ink colors than the standard ink colors, the image data is prepared based on the fine color designation conditions. Since the designation conditions are changed according to the number of ink colors to be used and the image forming processing is performed using the image data optimized according to the respective designation conditions suitable for the respective ink colors, the high image quality output is produced according to the number of ink colors to be used, without requiring any complicated processing.

Also, in the invention, the color tone correction processing, for example, with respect to the gamma correction, contrast, and brightness, is performed for the image data according to the number of ink colors to be used, when the image data is prepared based on the respective color designation conditions. Therefore, the image forming processing is performed using the image data optimized according to the number of ink colors to be used with respect to the color tones, resulting in the superior quality output mainly as to color tones.

Further, in the invention, since the image data is generated, corresponding to the image quality levels designated according to the number of ink colors to be used when the image data is prepared based on the respective color designation conditions, the image forming processing is performed using the image data optimized according to the number of ink colors to be used with respect to the image quality levels, such as the input resolution and the output resolution, resulting in the superior quality output mainly as to image quality.

Since the images can be formed onto a recording paper based on the image data obtained by reading the images from the original, this may be applied when a facsimile machine having copying functions, for example, is used stand-alone.

Since the images can be formed onto a recording paper based on the image data received from an external apparatus, this may be applied to a printer being used as the periphery equipment of a general personal computer, and a video printer that is connected to a television or a video camera.

Further in the invention, by activating the CPU based on the stored program, achieved is the operations of the image forming apparatus, such as detecting device that detects which of the standard ink colors or more ink colors than the standard ink colors, are to be used, and preparing an image data based on the standard color designation conditions suitable for the standard ink colors when the ink color use detecting device detects that the standard ink colors are to be used, and preparing the image data based on the fine color designation conditions suitable for more ink colors than the standard ink colors when the ink color use detecting device detects that more ink colors than the standard ink colors are to be used.

What is claimed is:

1. An image duplicating apparatus capable of forming images in a standard color style using standard ink colors or in a fine color style using more ink colors than the standard ink colors when images read from an original are duplicated on recording paper, comprising:

a setting copying mode determination device that determines whether a single-copying mode, where images read from the original are duplicated on a sheet of the recording paper, or a multi-copying mode, where images read from the original are duplicated on the sheets of the recording paper, is set; and a duplicating operation controlling device that starts duplicating in the fine color style when the setting copying mode determination device determines that the single-copying mode is set, and starts duplicating in the standard color style when the setting copying mode determination device determines that the multi-copying mode is set.

2. The image duplicating apparatus according to claim 1, further comprising:

a color style setting device that presets which of the standard or fine color styles is used for duplication, wherein when the setting copying mode determination device determines that the multi-copying mode is set, the duplicating operation controlling device starts duplicating in the standard color style regardless of the color style set by the color style setting device, and when the setting copying mode determination device determines that the single-copying mode is set, the duplicating operation controlling device starts duplicating in the color style set by the color style setting device.

3. An image duplicating apparatus capable of forming images in a standard color style using standard ink colors or in a fine color style using more ink colors than the standard ink colors when images read from an original are duplicated on recording paper, comprising:

a setting copying mode determination device that determines whether a single-copying mode, where images read from the original are duplicated on a sheet of the recording paper, or a multi-copying mode, where images read from the original are duplicated on the sheets of the recording paper, is set; and a duplicating operation controlling device that reduces the resolution of duplication data from the normal setting resolution and starts duplicating in the fine color style based on the duplication data obtained at a lower resolution when the setting copying mode determination device determines that the multi-copying mode is set.

4. The image duplicating apparatus according to claim 3, further comprising:

a color style setting device that presets which of the standard or fine color styles is used for duplication, wherein when the setting copying mode determination device determines that the multi-copying mode is set and the color style setting device sets the fine color style, the duplicating operation controlling device reduces the resolution of the duplication data from that set for duplicating in the standard color style, and starts duplicating in the fine color style based on the duplication data obtained at a lower resolution.

5. The image duplicating apparatus according to claim 1, wherein when the setting copying mode determination device determines that the multi-copying mode is set, duplication in either the standard color style, or in the fine color style by reducing the resolution of duplication data from the normal setting resolution and based on the duplication data obtained at a lower resolution, can be selected.

6. An image duplicating apparatus capable of forming images in a standard color style using standard ink colors or in a fine color style using more ink colors than the standard ink colors when images read from an original are duplicated on a recording paper, comprising:

an available memory calculation device that calculates the amount of free space available in a memory;

an available memory comparison device that compares the amount of free space available in the memory obtained by the available memory calculation device, with the predetermined value; and a duplicating operation controlling device that avoids duplicating in the fine color style and starts duplicating in the standard color style when the available memory comparison device produces the result that the amount of free space available in the memory is below the predetermined value.

7. The image duplicating apparatus according to claim 6, further comprising:

a setting copying mode determination device that determines whether a single-copying mode, where images read from the original are duplicated on a sheet of the recording paper, or a multi-copying mode, where images read from the original are duplicated on the sheets of the recording paper, is set; and a color style setting device that presets which of the standard or fine color styles is used for duplication, wherein when the available memory comparison device produces the result that the amount of free space available in the memory is below the predetermined value, the duplicating operation controlling device starts duplicating in the color style set by the color style setting device if the setting copying mode determination device determines that the single-copying mode is set.

8. A storage medium that stores programs for controlling an image duplicating apparatus capable of forming images in a standard color style using standard ink colors or in a fine color style using more ink colors than the standard ink colors when images read from an original are duplicated on recording paper, comprising:

a setting copying mode determination program for determining whether the single-copying mode, where images read from the original are duplicated on a sheet of the recording paper, or the multi-copying mode, where images read from the original are duplicated on the sheets of the recording paper, is set; and a duplicating operation controlling program for starting duplicating in the fine color style when it is determined based on the setting copying mode determination program that the single-copying mode is set, and for starting duplicating in the standard color style when it is determined based on the setting copying mode determination program that the multi-copying mode is set.

9. A storage medium that stores programs for controlling an image duplicating apparatus capable of forming images in a standard color style using standard ink colors or in a fine color style using more ink colors than the standard ink colors when images read from an original are duplicated on recording paper, comprising:

a setting copying mode determination program for determining which of the single-copying mode where images read from the original are duplicated on a sheet of the recording paper, or the multi-copying mode where images read from the original are duplicated on the sheets of the recording paper, is set; and a duplicating operation controlling program for reducing the resolution of duplication data from the normal setting resolution when it is determined based on the setting copying mode determination program that the multi-copying mode is set and starting duplicating in the fine color style.

10. A storage medium that stores programs for controlling an image duplicating apparatus capable of forming images in a standard color style using standard ink colors or in a fine color style using more ink colors than the standard ink colors when images read from an original are duplicated on recording paper, comprising:

an available memory calculation program for calculating the amount of free space available in a memory;

an available memory comparison program for comparing the amount of free space available in the memory obtained by the calculation based on the available memory calculation program, with the predetermined value; and a duplicating operation controlling program for avoiding duplicating in the fine color style and starting duplicating in the standard color style, when a result, that the amount of free space available in the memory is below the predetermined value, is obtained based on the available memory comparison program.

11. An image forming apparatus capable of forming images onto recording paper using standard ink colors or using more ink colors than standard ink colors and capable of processing image data for the image forming processing, comprising:

an ink color use detecting device that detects which of the standard ink colors or more ink colors than the standard ink colors, are to be used; and an image data preparing device that prepares image data based on standard color designation conditions suitable for the standard ink colors when the ink color use detecting device detects that the standard ink colors are to be used, and that prepares the image data based on fine color designation conditions suitable for more ink colors than the standard ink colors when the ink color use detecting device detects that more ink colors than the standard ink colors are to be used.

12. The image forming apparatus according to claim 11, wherein when the image data preparing device prepares the image data based on standard color designation conditions or the fine color designation conditions, color tone correction processing designated according to respective color designation conditions is performed for the image data.

13. The image forming apparatus according to claim 11, wherein when the image data preparing device prepares the image data based on the standard color designation conditions or the fine color designation conditions, the image data is generated corresponding to image quality levels designated according to the respective color designation conditions.

14. The image forming apparatus according to claim 11, further comprising:

an image input device that reads images from an original to obtain the image data, wherein the image data preparing device reads the image data from the image input device and applies respective color designation conditions to generate the image data according to a number of ink colors to be used.

15. The image forming apparatus according to claim 11, further comprising:

an interface capable of receiving the image data from an external apparatus, wherein the image data preparing device receives the image data from the external apparatus via the interface and applies respective color designation conditions to generate the image data according to a number of ink colors to be used.

16. A storage medium that stores programs for controlling an image forming apparatus capable of forming images onto recording paper using standard ink colors or using more ink colors than the standard ink colors and capable of processing image data for the image forming processing, comprising:

a ink color use detecting program for detecting which of the standard ink colors or more ink colors than the standard ink colors, are to be used; and an image data preparing program for preparing the image data based on standard color designation conditions suitable for the standard ink colors when it is detected, based on the ink color use detecting program, that the standard ink colors are to be used, and for preparing the image data based on fine color designation conditions suitable for more ink colors than the standard ink colors when it is detected, based on the ink color use detecting program, that more ink colors than the standard ink colors are to be used.

17. An image forming apparatus capable of recording image data on a medium as images using more than one ink color, comprising:

an image recording device that records the images on the medium using a first combination of inks under a first condition or using a second combination of inks under a second condition; and a setting copying mode determination device that determines whether a single-copying mode, where the same image data is recorded on a singularity of the medium as the images, or a-multi-copying mode, where the same image data is recorded on a plurality of the medium as the images, is set, wherein the first condition is when the setting copying mode determination device determines that the image forming apparatus is set in the multi-copying mode, and the second condition is when the setting copying mode determination device determines that the image forming apparatus is set in the single-copying mode.

18. The image forming apparatus according to claim 17, further comprising:

an image reading device that reads the images from an original in a first manner or a second manner according to a result of the determination by the setting copying mode determination device to form the image data, wherein the image reading device reads the images from the original in the first manner under the first condition or in the second manner under the second condition.

19. The image forming apparatus according to claim 17, further comprising:

a recording mode setting device that presets whether a first recording mode, where the first combination of inks is used, or a second recording mode, where the second combination of inks is used, is employed when the image recording device records the images on the medium.

20. The image forming apparatus according to claim 18, further comprising:

a recording mode setting device that presets whether a first recording mode, where the first combination of inks is used, or a second recording mode, where the second combination of inks is used, is employed when the image recording device records the images on the medium.

21. The image forming apparatus according to claim 20, wherein when the setting copying mode determination device determines that the image forming apparatus is set in the multi-copying mode, the image reading device reads the images from the original in the first manner if the first recording mode is set by the recording mode setting device, or in the second manner if the second recording mode is set by the recording mode setting device.

22. The image forming apparatus according to claim 20, wherein when the setting copying mode determination device determines that the image forming apparatus is set in the single-copying mode, the image reading device reads the images from the original in the second manner regardless of the recording mode set by the recording mode setting device.

23. The image forming apparatus according to claim 20, wherein when the setting copying mode determination device determines that the image forming apparatus is set in the single-copying mode, the image reading device reads the images from the original according to the recording mode set by the recording mode setting device.

24. An image forming apparatus capable of recording image data on a medium as images using more than one ink color, comprising:

an image recording device that records the images on the medium using a first combination of inks under a first condition or using a second combination of inks under a second condition, and an available memory determination device that determines whether an amount of free space available in a memory exceeds a predetermined value, wherein the first condition is when the available memory determination device determines that the amount of free space available in a memory does not exceed the predetermined value and the second condition is when the available memory determination device determines that the amount of free space available in the memory exceeds the predetermined value.

25. The image forming apparatus according to claim 24, further comprising:

a setting copying mode determination device that determines whether a single-copying mode, where the same image data is recorded on the singularity of the medium as the images, or a-multi-copying mode, where the same image data is recorded on the plurality of the medium as the images, is set, wherein the images are formed in the second recording mode when the setting copying mode determination device determines that the single-copying mode is set, even if the available memory determination device determines that the condition is the first condition.

26. The image forming apparatus according to claim 25, further comprising:

an image reading device that reads the images from the original, wherein the image reading device reads the images from the original in the first manner when the image recording device records the images on the medium using the first combination of inks or in the second manner when the image recording device records the images on the medium using the second combination of inks.

27. The image forming apparatus according to claim 24, further comprising:

a recording mode setting device that presets whether a first recording mode, where the first combination of inks is used, or a second recording mode, where the second combination of inks is used, is employed when the image recording device records the images on the medium.

28. The image forming apparatus according to claim 27, wherein the images are formed according to the recording mode set by the recording mode setting device in the second condition.

29. The image forming apparatus according to claim 27, further comprising:

a setting copying mode determination device that determines whether a single-copying mode where the same image data is recorded on the singularity of the medium as the images, or a multi-copying mode where the same image data is recorded on the plurality of the medium as the images, is set, wherein the images are formed in the second recording mode when the setting copying mode determination device determines the single-copying mode is set even if the available memory determination device determines that the condition is the first condition.

30. The image forming apparatus according to claim 17, further comprising:

an image reading device that reads the images from the original, wherein the image reading device reads the images from the original in the first manner when the image recording device records the images on the medium using the first combination of inks or in the second manner when the image recording device records the images on the medium using the second combination of inks.

31. The image forming apparatus according to claim 17, further comprising:

an image quality/color tone precedence setting device that presets whether quality or color tone of the images to be formed, is preferred.

32. The image forming apparatus according to claim 31, further comprising:

an image reading device that reads the images from an original, wherein the image reading device reads the images from the original at a predetermined resolution when the image recording device records the images on the medium using the first combination of inks, or at a lower resolution than the predetermined resolution when the image recording device records the images on the medium using the second combination of inks.

33. An image forming apparatus capable of recording image data on a medium as images using more than one ink color, comprising:

an image recording device that records the images on the medium using a first combination of inks under a first condition or using a second combination of inks under a second condition, wherein the first condition is when the first combination of inks is mounted on the apparatus and the second condition is when the second combination of inks is mounted on the apparatus.

34. The image forming apparatus according to claim 33, further comprising:

an image reading device that reads the images from an original, wherein the image reading device reads the images from the original at a predetermined resolution when the image recording device records the images on the medium using the first combination of inks, or at a lower resolution than the predetermined resolution when the image recording device records the images on the medium using the second combination of inks.

35. The image forming apparatus according to claim 34, further comprising:

a color tone correcting device that corrects a color tone of the image data obtained by reading the images from the original by the image reading device, wherein the color tone correcting device performs correction processing so that the color tone of the images read at the predetermined resolution by the image reading device becomes low or so that the color tone of the images read at a lower resolution than the predetermined resolution becomes high.

* * * * *